Figure 1:
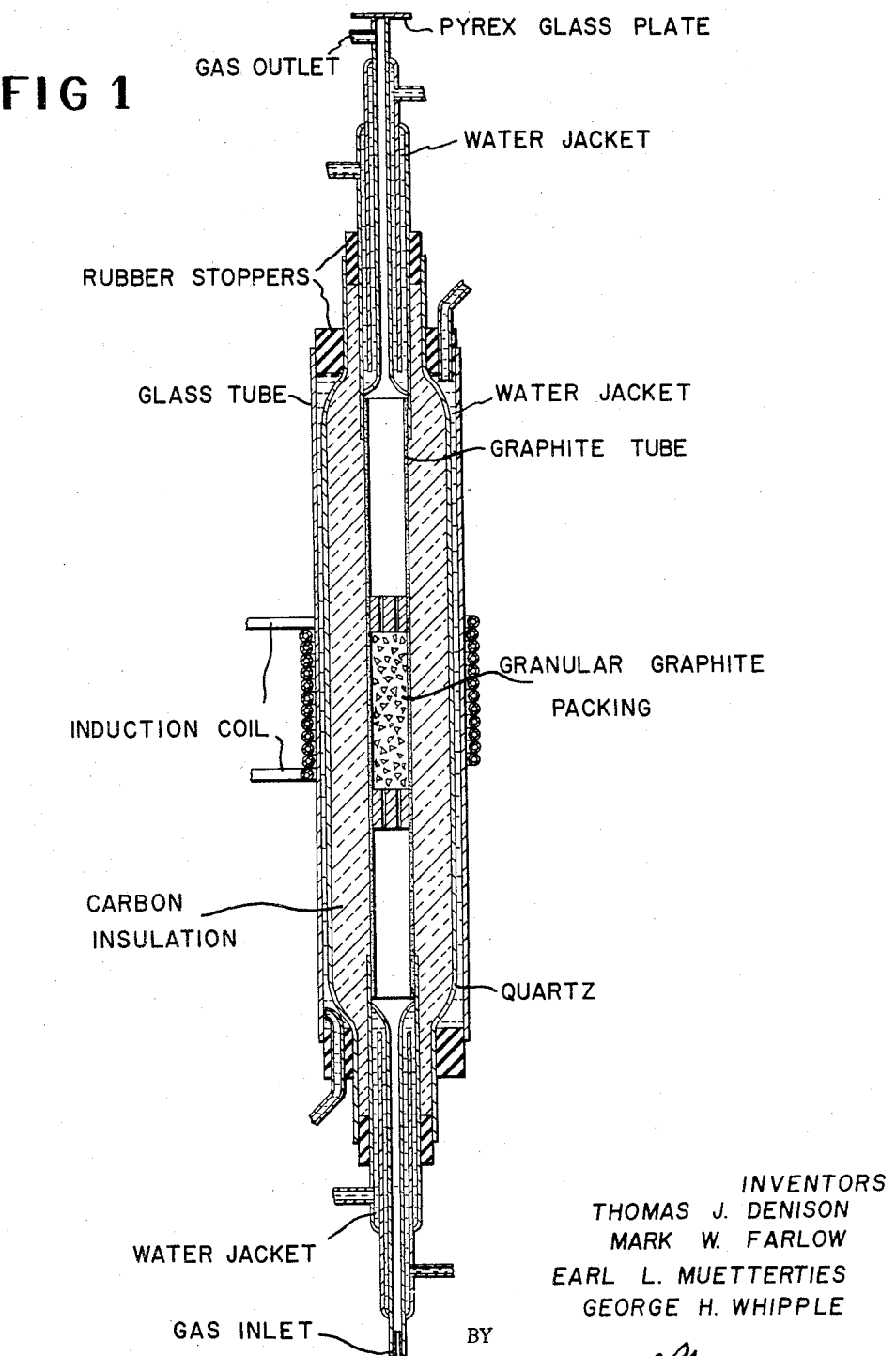

United States Patent Office 2,884,467
Patented Apr. 28, 1959

2,884,467

PREPARATION OF FLUOROCARBON COMPOUNDS FROM PHOSPHOROUS V FLUORIDE AND CARBON

Jack Thomas Denison and Mark Wendell Farlow, Wilmington, and Earl Leonard Muetterties, Hockessin, Del., and George Henry Whipple, West Chester, Pa., assignors to E. I. du Pont de Nemours and Company, Wilmington, Del., a corporation of Delaware Application May 24, 1955, Serial No. 510,636

1 Claim. (Cl. 260—653.3)

This invention relates to an improved process for preparing fluorine containing compounds and particularly to the preparation of tetrafluoroethylene.

Compounds which contain only fluorine and carbon, which are known as fluorocarbons, possess considerable utility in many fields of applied chemistry, for example as refrigerants dielectric fluids, intermediates for polymeric materials, propellants in aerosol compositions, etc. One of these fluorocarbons, tetrafluoroethylene, has achieved commercial success in the form of its polymer. However the relatively high cost of synthesis has prevented the use of these polymers in a wide variety of commercial applications.

Recently a novel process for preparing fluorocarbons compounds was disclosed in copending application Serial No. 409,484, filed February 10, 1954, now U.S. Patent 2,709,189, in which carbon is reacted with an inorganic binary fluoride at very high temperatures to give rise to fluorocarbon compounds. The binary fluorides useful for the production of fluorocarbon compounds are the fluorides of the elements of group VA and VIA of the periodic table. Tetrafluoroethylene was formed by this reaction at temperatures above 2500° C.

The present invention has an an object an improved method of preparing fluorocarbon compounds in general and tetrafluoroethylene in particular. Other objects will be apparent hereinafter.

The objects of the present invention are accomplished by a process wherein phosphorus pentafluoride in the presence of carbon is converted into essentially quantitive amounts of phosphorus trifluoride by heating phosphorus pentafluoride under conditions wherein all of the phosphorus pentafluoride attains a temperature of at least 1000° C., then quenching the reacted gases to a temperature below 500° C. and recovering the fluorocarbon compounds and phosphorus trifluoride and wherein the composition of the fluorocarbon compounds is controlled by the reaction heat, the pressure of the gases in the reaction zone, and the quench time necessary to cool the reactant gases to below 500° C. The surprising feature of this invention is that it is now possible to convert phosphorus pentafluoride almost quantitatively into phosphorus trifluoride and fluorocarbons. This process when carried out at temperatures above 1600° C. and at quench rates wherein the reactant gases are cooled to below 500° C. in less than 10 milliseconds results in fluorocarbon compositions containing substantial amounts of tetrafluoroethylene. In a preferred form of the invention the tetrafluoroethylene and the phosphorus trifluoride are separated from the residual fluorocarbon compounds. The remaining fluorocarbon compounds may be recycled to give additional tetrafluoroethylene as described in copending application Serial No. 477,676, filed by M. W. Farlow on December 27, 1954, now Patent No. 2,839,-723. The basic requirement for the successful operation of this process depends on the heating of all of the phosphorus pentafluoride to at least 1000° C. The temperature of the gas is a function of contact time and furnace temperature and can be calculated for the individual equipment and flow rates employed. One of the major advantages of the process of this invention is that quantitative yields of phosphorus trifluoride are obtained which may be converted to phosphorus pentafluoride and recycled to give additional fluorocarbon compounds. The conversion of phosphorus trifluoride into phosphorus pentafluoride may be conveniently carried out by a method disclosed in copending application S.N. 334,967, filed February 3, 1953. Phosphorus trifluoride is treated with chlorine and phosphorus dichlorotrifluoride is obtained. The phosphorus dichlorotrifluoride on heating disproportionates into phosphorus pentafluoride and phosphorus pentachloride. The phosphorus pentachloride is then reacted with calcium fluoride at a temperature in the range of 300° C. to 600° C. A very high yield of phosphorus pentafluoride is obtained from this reaction. The process is illustrated by the following equations:

$$5PF_3 + 5Cl_2 \rightarrow 5PF_3Cl_2 \rightarrow 3PF_5 + 2PCl_5$$

$$2PCl_5 + 5CaF_2 \rightarrow 2PF_5 + 5CaCl_2$$

The phosphorus pentafluoride formed may be further purified or used as obtained in the present process.

The process of this invention employing rapid quenching normally gives a mixture of fluorocarbons the preponderant components of which are tetrafluoroethylene, carbon tetrafluoride, and phosphorus trifluoride as illustrated by the following equations:

$$2PF_5 + C \rightarrow PF_3 + CF_4$$

$$2PF_5 + 2C \rightarrow PF_3 + C_2F_4$$

The composition of the fluorocarbons obtained may be controlled within the limits of the reaction by reaction conditions such as reaction temperature, contact time and pressure of the gases in the hot zone and quench time, by which is meant the time necessary to cool the gases from the reaction temperatures to below 500° C. At temperatures below 1600° C. and at long quench times or in the absence of quenching the primary product is carbon tetrafluoride. When the temperature is increased above 1600° C. and when short quench times are employed the yield of tetrafluoroethylene is increased. The upper temperature limits in the preparation of tetrafluoroethylene are dependent on the ability to quench the reaction product as described hereinbelow in greater detail. The lower temperature limit is that temperature required to cause the decomposition of phosphorus pentafluoride into phosphorus trifluoride, determined to be approximately 1000° C. Minor amounts of higher saturated and unsaturated fluorocarbons such as hexafluoroethane, hexafluoropropylene and octafluoropropane are also formed. The quantity of higher fluorocarbons, particularly hexafluoropropylene, may be increased by rapidly quenching the reaction products to 800° C. at which temperature tetrafluoroethylene is formed but is capable of reacting with fluorocarbon radicals to form higher fluorocarbons.

In a preferred embodiment of this invention, the process is carried out by passing vaporized phosphorus pentafluoride through a cylindrical graphite tube heated to a temperature of 1600 to 2600° C. and preferably at a temperature of about 2000 to 2500° C. by an electric induction or resistance furnace, rapidly quenching the reaction mixture in a graphite tube to obtain a high yield of tetrafluoroethylene and then separating the tetrafluoroethylene and the phosphorus trifluoride from the reaction mixture and recycling the recovered fluorocarbons and reconverting the phosphorus trifluoride to phosphorus pentafluoride which can be recycled.

The process of this invention may also be carried out by passing vaporized phosphorus pentafluoride through the arc produced by passing an electric current between electrodes where the temperature is generally estimated to be above 4000° C., rapidly quenching the reaction mixture in the presence of carbon to obtain a high yield of tetrafluoroethylene and then separating the tetrafluoroethylene and phosphorus trifluoride from the reaction mixture. It is to be understood however that although the temperature of the arc may be 4000° C. or above the temperature of the reactants may be significantly lower and may be lowered or increased by increasing or lowering the rate of flow of the phosphorus pentafluoride in the arc to give maximum conversion to tetrafluoroethylene. In this respect it is important that all of the phosphorus pentafluoride is heated to above 1000° C. to form the essential quantitative yield of phosphorus trifluoride. The reactions of the process of this invention may in general be carried out in equipment capable of providing a temperature of at least 1000° C. and a source of carbon.

High conversions to tetrafluoroethylene can be obtained only if the temperature of the reaction zone is above 1600° C. and the reaction products from the hot reaction zone are cooled rapidly to a temperature of about 500° C. or below, i.e., quenched. While the chemical processes which occur during quenching are not well understood, it has been demonstrated that quenching of the product from the reaction temperature to about 500° C. is essential to the success of the process. The time during which the reaction mixture is cooled, i.e., the time of transition from the reaction temperature to about 500° C., at which tetrafluoroethylene is stable, referred to herein as quench time, should not exceed 100 milliseconds and is preferably below 10 milliseconds.

In carrying out the reaction in the preferred embodiment involving the use of a graphite tube, packed with granular graphite or carbon, through which the phosphorus pentafluoride passes as it is heated and from which some of the carbon necessary to the reaction is obtained, satisfactory heating of the reaction zone can be obtained by conventional electric induction heaters or by graphite or carbon resistance heaters. Power supplied to an induction heating unit by a commercial 7.5 kva. converter operated at 350-400 kc. is satisfactory for small scale runs. Graphite resistance units producing 2600° C. by passing 900 amperes at about 30 volts D.C. were found to heat the reaction zone satisfactorily in small scale operations.

Carbon arcs can be operated at low or high voltages and with either direct or alternating currents. All of these various arc operating conditions can be employed in the process of this invention. Good results in the arc process are obtained when phosphorus pentafluoride is passed through arcs produced between carbon electrodes by an electric current of above 10 volts and above 10 amperes and if all of the phosphorus pentafluoride is contacted with the arc. The process however is not limited to the use of these specific conditions.

The absolute pressure of phosphorus pentafluoride in the reaction zone is not critical when it is desired to prepare carbon tetrafluoride. Good results are obtained at pressures as low as 1 mm. of mercury as well as atmospheric and even superatmospheric pressures. Low pressures however are preferred, when phosphorus pentafluoride is reacted with carbon to result in high conversions to tetrafluoroethylene. Reaction pressures should not exceed 300 mm. mercury absolute pressure in such cases.

The optimum rate of flow of the phosphorus pentafluoride through the reaction zone depends on the contact time of the gas in the hot zone and the temperature of the hot zone. The general effect of temperatures on the composition of the fluorocarbon compounds has been discussed hereinabove. The rate of flow should be adjusted in such a manner that the contact time of the phosphorus pentafluoride is sufficiently long enough for the gas to reach reaction temperatures. Once the reaction temperature has been reached the reaction of phosphorus pentafluoride to form phosphorus trifluoride is believed to be extremely rapid. The minimum contact time needed for any furnace temperature may thus be calculated from heat transfer equations and measurements known to those skilled in the art. At temperatures of 1600° to 2600° C. it is desirable to have a longer contact time and thus a lower rate of flow. At very high temperatures such as 4000° C. and above it may be desirable to employ shorter contact times so as to increase the efficiency of the reaction system. Efficient and therefore preferable contact times in the preparation of tetrafluoroethylene are below 300 milliseconds.

The optimum rate of flow is also dependent on the efficiency of the quenching system. As stated hereinabove a rapid quenching rate in the presence of carbon is necessary to obtain a high yield of tetrafluoroethylene. High quenching rates are obtained at high flow rates, since high flow rates will cause a more rapid removal of the reaction products from the hot reaction zone. It is also possible to increase the rate of flow in the quenching operation by adding an inert diluent subsequent to the hot zone which increases the linear velocity of the product gases away from the hot zone. Such a quenching system will permit rapid quenching at low flow rates through the hot zone which may be desirable at lower reaction temperatures. In general, the maximum throughput of the phosphorus pentafluoride will depend on the construction of the hot zone and the efficiency of the quenching process.

The separation of tetrafluoroethylene and phosphorus trifluoride can be accomplished by careful fractional distillation of the condensed reaction product. Other methods of separation include selective solvent extraction or selective adsorption on solids. However, in many cases it is not essential for the tetrafluoroethylene to be completely freed of minor fluorocarbon impurities such as hexafluoroethane.

The by-product fluorocarbons obtained in the process can be recycled separately from the starting phosphorus pentafluoride to produce more tetrafluoroethylene. This is an especially desirable aspect of the process of this invention since by such recycling of by-products complete conversion of the starting fluorocarbon to the desired tetrafluoroethylene can be accomplished, if suitable conditions are selected.

The process of this invention is further illustrated by the following examples. In these examples the reaction is carried out in an induction heated or resistance heated graphite tube. Details of the preferred induction heated graphite tube furnace are shown in Figure 1. A commercial grade graphite tube is satisfactory for use. When carbon packing is used in the tube, sufficient granular carbon, e.g. graphite of 4 to 8 mesh, is placed in the tube to fill the portion of the tube within the heating zone. The granular packing is held in place by short lengths of graphite rod of diameter just less than the inside diameter of the reactor tube. The rods are perforated lengthwise with several ⅛ inch holes. Both sections of the perforated graphite rods are pinned to the furnace tube by small graphite pins. One end of the furnace tube is fitted with a ¼ inch Pyrex glass plate to serve as a window for observation of the granular packing with an optical pyrometer. In assembling the apparatus, for operation, the furnace is mounted vertically in a suitable support, the uppermost rubber stopper is moved up on the copper tube holder, and carbon insulation is added to fill the area between the graphite reaction tube and the quartz jacket. The rubber stopper is then replaced in such a way that the graphite tube during subsequent heating is free to expand into the copper holder. The furnace is then mounted in the desired position, either vertical or horizontal, and appropriate connections are made at the ends of the furnace for bringing in the reactants and taking off the product, water is circulated through the tube holders and furnace water jacket and the electric current is applied to the induction heater. A suitable type of carbon insulation for use in the graphite tube furnace is a high purity acetylene black and preferably compacted acetylene black. The furnace as described hereinabove produces a maximum temperature of approximately 2400° C. when electric power from a 7.5 kva. converter operated at 350 to 400 kc. is used.

Figure 2:
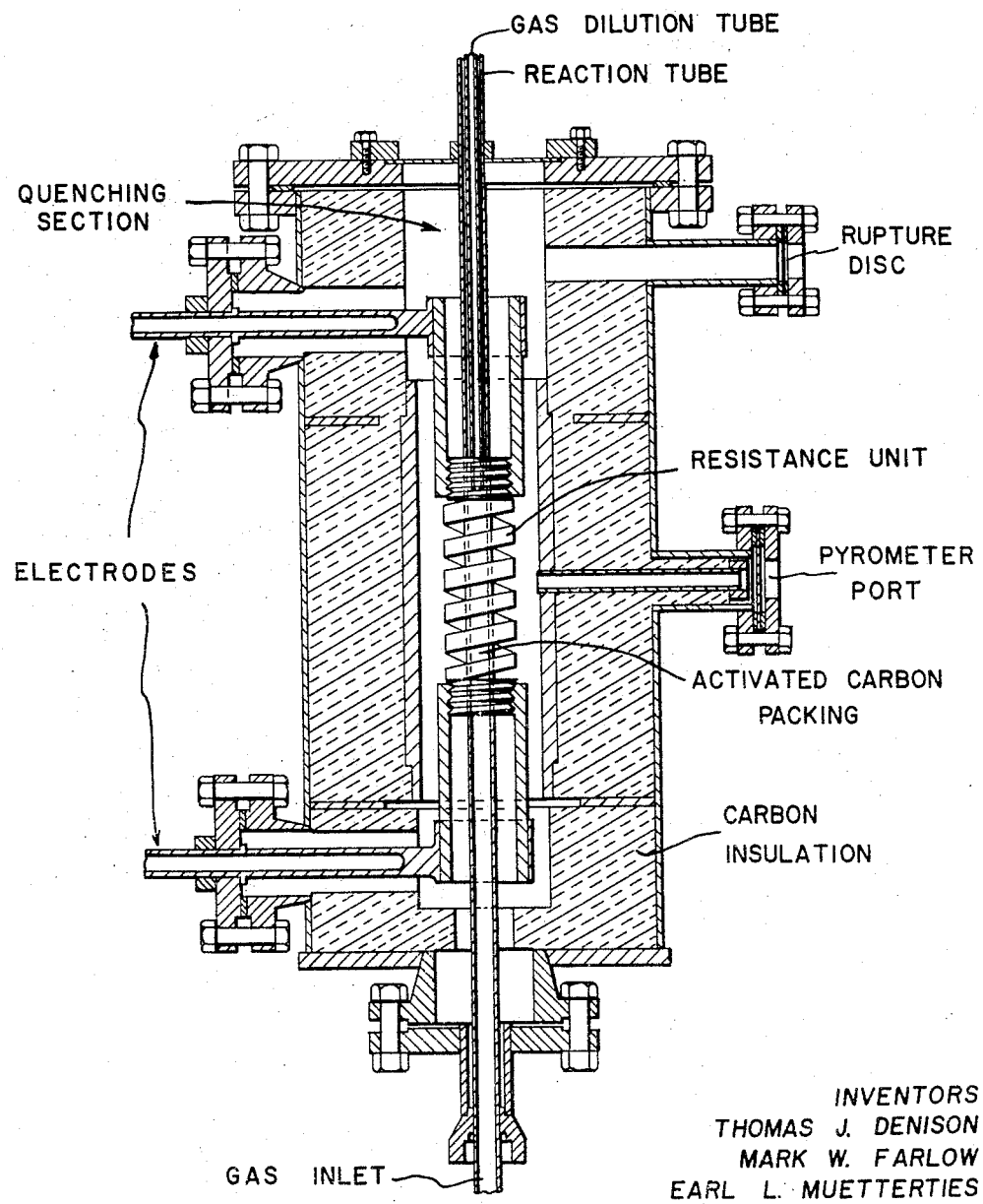

Details of a resistance furnace are shown in Figure 2. Similar to the induction furnace a packed graphite tube is used through which the phosphorus pentafluoride passes. Preferably the graphite tube is reimpregnated with amorphous carbon to decrease diffusion of the gases through the walls of the tube. At the center of the furnace surrounding the graphite tube is placed a graphite resistor element. The resistor element is in the shape of a helix 8" long and 3¾" in diameter with a 1" wide ⅝" thick graphite segment. The element can be heated to 2600° C. by passing 900 amperes at about 30 volts D.C. through it. The resistance unit is attached to the two metal electrodes and is insulated by porous graphite blocks. The reaction temperature is measured through the pyrometer port by an optical pyrometer trained on the reaction tube. The whole assembly is placed into a water cooled metal drum. Into the quenching section of the furnace is introduced a graphite tube of smaller outer diameter than the inner diameter of the reaction tube through which the diluent gas is passed. The reaction products are then quenched in the section between the outer and inner graphite tube. Of course it is also possible to reverse this system and quench the reaction products in the inner graphite tube by passing the diluent through the outer graphite tube.

*Example 1.*—In this example a graphite tube induction furnace of the type illustrated in Figure 1 is employed. Phosphorus pentafluoride is passed through a furnace having a graphite tube ¾" diameter and 14" long packed in the center four inches with granular graphite of 4 to 8 mesh size at a rate of 200 g./hour with the reaction zone maintained at about 2000° C. (measured by an optical pyrometer focused on the granular graphite through one of the holes in the perforated graphite rods holding the granular graphite in the center of the graphite tube). The pressure of the reactant gas at the inlet to the furnace was 66 to 80 mm. mercury (absolute) and the exit pressure was about 16 mm. mercury (absolute). The reactant gases were quenched to below 500° C. in less than 0.1 second. The phosphorus pentafluoride was essentially completely converted into phosphorus trifluoride; no phosphorus pentafluoride could be detected in the quenched reaction product. The residual composition of the reaction product, primarily those products obtained by reaction of the fluorine released from the pentafloride and carbon was found to be as follows:

| | Mol percent |
|---|---|
| Carbon tetrafluoride | 49 |
| Tetrafluoroethylene | 24 |
| Hexafluoroethane | 1 |
| Higher fluorocarbons | 2 |
| Dichlorodifluoromethane* | 4 |
| Chlorotrifluoroethylene* | 2 |
| Silicon tetrafluoride* | 2 |

The last three compounds which have been starred are believed to be due to impurities in the phosphorus pentafluoride due to the method of preparation.

*Example 2.*—In this example the graphite tube resistance furnace illustrated in Figure 2 was used. Phosphorus pentafluoride is passed through a furnace having a graphite tube ⅞" in diameter and 35" long packed in the center with 8 inches of granular carbon of 4–8 mesh size under heating and quenching conditions indicated in the table below. The composition of the quenched reaction product resulting from these operating conditions is also indicated in the table as well as the yields of the fluorocarbon compounds based on the fluorine available from the decomposition of phosphorus pentafluoride. The temperature of the reactor tube was measured by an optical pyrometer as indicated in Figure 2. The rate of quenching was increased by diluting the products from the hot zone with helium as indicated in Figure 2.

| | I | II | III | IV |
|---|---|---|---|---|
| Operating Conditions: | | | | |
| Temperature of Furnace, ° C. | 2,400 | 2,150 | 2,440 | 2,450 |
| Feed rate (ml./min.) | 102 | 102 | 788 | 8 |
| Hot Zone Inlet Pressure (mm./Hg.) | 30 | 40 | 758 | 122 |
| Hot Zone Exit Pressure (mm./Hg.) | 20 | 33 | 750 | 120 |
| Helium dilution rate (ml./min.) | 110 | 235 | | |
| Hot Zone Contact Time (milliseconds) | 60 | 100 | 300 | 4,758 |
| Quench Time (milliseconds) | 3 | 3 | 30 | ² 510 |
| Composition of Reaction Products (Mol Percent): | | | | |
| Phosphorus trifluoride | 67.7 | 65.4 | 65.3 | 69.7 |
| Phosphorus oxyfluoride ¹ | 2.4 | 1.9 | 0.4 | |
| Silicon tetrafluoride ¹ | 1.7 | 1.8 | 6.2 | 1.0 |
| Carbon tetrafluoride | 12.8 | 20.3 | 25.2 | 14.3 |
| Tetrafluoroethylene | 11.0 | 7.8 | 1.6 | 4.6 |
| Higher fluorocarbon | 4.5 | 2.8 | 1.2 | 10.4 |
| Yields Based On Available Fluorine (Mol Percent): | | | | |
| Carbon tetrafluoride | 39.1 | 59.0 | 72.3 | 40.3 |
| Tetrafluoroethylene | 33.6 | 22.7 | 4.6 | 13.0 |
| Hexafluoroethane | 16.0 | 9.6 | 3.9 | 11.4 |
| Octafluoropropane | 4.3 | 2.3 | 0.6 | |
| Octafluorobutene | 1.8 | 1.2 | | |
| Hexafluoropropylene | | | 0.9 | 32.5 |
| Silicon tetrafluoride ¹ | 5.2 | 5.2 | 17.8 | 2.8 |
| Conversion of released fluorine to fluorocarbon, percent | 95 | 95 | 82 | 97 |

¹ Results due to impurities in the phosphorus pentafluoride.
² Quench time to 800° C., 10 milliseconds.

As can be seen from the above data no unreacted phosphorus pentafluoride is obtained in the reaction product. The conversion of fluorine released from the decomposition of phosphorus pentafluoride to phosphorus trifluoride, is essentially quantitative, with the exception of silicon tetrafluoride which is formed as the result of silicon impurities in the phosphorus pentafluoride. The first two runs show that high yields of tetrafluoroethylene are obtained, when quench times below 10 milliseconds are employed and when reaction pressures below 100 mm. mercury are used. The third run shows that even at high temperatures the major product obtained is carbon tetrafluoride when using longer quench times and higher reaction pressures. In the fourth run short quench times were employed to cool the reactant gases from the reaction temperature to 800° C. and long quench times were employed to cool the reactant gases from 800° C. to 500° C. The result of such a quenching procedure as indicated by the results, was to increase the amount of higher fluorocarbon compound formed in particular the amount of hexafluoropropylene.

*Example 3.*—Using the graphite tube resistance furnace illustrated in Figure 2 phosphorus pentafluoride was reacted with carbon at a temperature of 1300° C. The vaporized phosphorus pentafluoride was added at the rate of 100 ml./min. and atmospheric pressure. The contact time in the hot zone was 6–10 seconds. The gas was cooled to below 500° C. without a diluent. The composition of the product was found to contain no unreacted phosphorus pentafluoride. The only fluorocarbon compound found in the product gas was carbon tetrafluoride. The reaction was repeated at a temperature of 900° C., only 90% of the phosphorus pentafluoride was converted to phosphorus trifluoride; the fluorocarbon compound formed under these conditions was exclusively carbon tetrafluoride.

The examples have illustrated the process of this invention by the preferred embodiment involving passage of phosphorus pentafluoride through a graphite tube furnace to result in quantitative conversion of phosphorus pentafluoride into phosphorus trifluoride and fluorocarbon compounds. However, the conversion of phosphorus pentafluoride to phosphorus trifluoride and fluorocarbons can be carried out in the presence of other forms of carbon either amorphous or crystalline. Thus the conversion can be carried out in reactors made of or packed with coal, graphite, charcoal and the various forms of carbon black such as lamp black, acetylene black, bone black, etc.

The phosphorus pentafluoride and the carbon used in the process of this invention are preferably substantially anhydrous. Phosphorus pentafluoride may be prepared from phosphorus pentachloride as described hereinabove.

It is not necessary that the phosphorus pentafluoride be absolutely pure as shown by the examples although the presence of such minor impurities does effect the composition of the products as obtained after quenching. Depending on the cost of purifying phosphorus pentafluoride it may therefore be desirable to use purified phosphorus pentafluoride as the starting material.

As indicated previously, an important advantage of the process of this invention over the heretofore known methods of preparing tetrafluoroethylene is the ability to obtain a substantially quantitative conversion of fluorine as released by phosphorus pentafluoride to fluorocarbon compounds and a quantitative conversion and recovery of phosphorus trifluoride which may be reconverted to phosphorus pentafluoride and recycled to produce more fluorocarbon compounds. Thus a highly economical process using low cost starting materials to prepare the heretofore highly expensive, extremely useful fluorocarbon compounds is provided by the present invention.

The foregoing detailed description has been given for clearness of understanding only and no unnecessary limitations are to be understood therefrom. The invention is not limited to the exact details shown and described for obvious modifications will occur to those skilled in the art.

We claim:

A process for the preparation of tetrafluoroethylene which comprises contacting at a temperature of 1600° C. to 2500° C. phosphorus pentafluoride with carbon, the reaction time being sufficient to increase the temperature of all phosphorus pentafluoride charged to a temperature of 1600° C. to 2500° C., the reaction mixture then being cooled to below 500° C. in less than 10 milliseconds, separating tetrafluoroethylene and phosphorus trifluoride from the resulting mixture, regenerating phosphorus pentafluoride from phosphorus trifluoride by contacting said phosphorus trifluoride with chlorine, separating the resulting phosphorus pentafluoride and phosphorus pentachloride, heating said phosphorus pentachloride with calcium fluoride to a temperature of 300 to 600° C., separating phosphorus pentafluoride and recirculating all phosphorus pentafluoride produced from said phosphorus trifluoride.

References Cited in the file of this patent
UNITED STATES PATENTS

| | | |
|---|---|---|
| 2,709,186 | Farlow et al. | May 24, 1955 |
| 2,759,026 | McCleary | Aug. 14, 1956 |

UNITED STATES PATENT OFFICE
CERTIFICATE OF CORRECTION

Patent No. 2,884,467 April 28, 1959

Jack Thomas Denison et al.

It is hereby certified that error appears in the printed specification of the above numbered patent requiring correction and that the said Letters Patent should read as corrected below.

Column 1, lines 31 and 32, for "now U.S. Patent 2,709,189" read -- now U. S. Patent 2,709,186 --; line 68, for "Serial No. 477,676" read -- Serial No. 477,678 --; lines 69 and 70, for "now Patent No. 2,839,723" read -- now Patent No. 2,709,192 --.

Signed and sealed this 1st day of September 1959.

(SEAL)
Attest:

KARL H. AXLINE

Attesting Officer

ROBERT C. WATSON
Commissioner of Patents